United States Patent Office 3,773,727
Patented Nov. 20, 1973

3,773,727
PROCESS FOR PREPARING MALEIC ANHYDRIDE-CONJUGATED DIENE COPOLYMERS
Norman G. Gaylord, New Providence, N.J., assignor to Borg-Warner Corporation, Chicago, Ill.
No Drawing. Filed Mar. 31, 1972, Ser. No. 239,967
Int. Cl. C08f 5/04, 17/00
U.S. Cl. 260—78.5 BB                    4 Claims

ABSTRACT OF THE DISCLOSURE

A process for preparing alternating copolymers of maleic anhydride and conjugated dienes wherein the copolymers are prepared from adducts of maleic anhydride.

BACKGROUND AND SUMMARY OF THE INVENTION

The well known reaction of maleic anhydride with various acyclic conjugated dienes to produce Diels-Alder adducts, e.g. tetrahydrophthalic anhydride from maleic anhydride and butadiene, is widely used in organic syntheses. The preparaion of Diels-Alder adducts from cyclic dienes, e.g. exo-cis-3,6-endoxo-4-tetrahydrophthalic anhydride from maleic anhydride and furan, is also well known.

It has been disclosed in U.S. Pat. 3,491,068 (Jan. 20, 1970) that alternating copolymers of maleic anhydride and various conjugated dienes can be prepared in a homogeneous phase by conventional free radical initiators at a temperature at which the initiator has a half-life of 60 minutes, or preferably less.

One object of the present invention is to provide a novel process for preparing alternating copolymers of maleic anhydride and conjugated dienes.

Another object of the present invention is to provide a novel process for preparing alternating copolymers from conjugated dienes and the Diels-Alder adduct of furan and maleic anhydride.

These and other objects of the present invention will become readily apparent from the following detailed description and illustrative examples.

In accordance with the present invention it has now been found that alternating copolymers of maleic anhydride and conjugated dienes can be prepared by reacting the furan-maleic anhydride and 2-methylfuran-maleic anhydride Diels-Alder adducts with conjugated dienes in the presence of conventional free-radical initiators.

DESCRIPTION OF THE PREFERRED EMBODIMENTS

The conjugated dienes which are useful for the preparation of copolymers by the process of this invention comprise compounds having the following general structural formula:

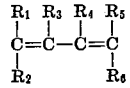

where $R_1$, $R_2$, $R_3$, $R_4$, $R_5$, and $R_6$, which may be the same or different, represent a member of the group consisting of hydrogen, halogen, alkoxyl, aryl, cycloalkyl, or alkyl radicals having from 1 to 40 carbon atoms, and preferably from about 1 to 8 carbon atoms. Illustrative conjugated dienes include butadiene, isoprene, 1,3-pentadiene, 1-methoxy-1,3-butadiene, 2,3-dimethyl-1,3-butadiene, 2,5-dimethyl-2,4-hexadiene, etc.

The molar ratio of the conjugated diene to the furan-or 2-methylfuran-maleic anhydride adduct may range from about 5:1 to 1:5, and preferably about 1:1 since the copolymers contain maleic anhydride and the conjugated diene in a 1:1 molar ratio, regardless of the feed ratio. Mixtures of conjugated dienes may be used, maintaining the molar ratio of diene to the addulct within the indicated range.

The required free radicals may be provided by the use of conventional free radical polymerization initiators such as tert-butyl peroxypivalate, benzoyl peroxide, azobisisobutyronitrile, etc. Other peroxygen and azo compounds are equally useful.

The concentration of the free radical initiator may vary from 1–10 mole-percent of the adduct used. However, the polymerization reaction must be carried out at a temperature at which radicals are rapidly generated, e.g. at a temperature at which the half-life of the initiator, $t_{1/2}$, is 60 minutes or less, preferably one half hour. The choice of the initiator is, therefore, dictated by the temperature selected for the polymerization reaction.

The reaction temperature employed may range from 60° 200° C., and preferably from about 80° to 150° C. Either atmospheric or superatmospheric pressures may be employed. Although the polymerization may be carried out under an inert atmosphere, it is often convenient and desirable not to exclude air or oxygen from the system.

The reaction may be carried out in the presence of any organic solvent in which the adduct and diene are soluble and which is inert towards anhydrides, i.e. any solvent which does not contain reactive hydrogen atoms such as alcohols, mercaptans or amines. Thus, suitable solvents include ethers, esters, ketones, or mixtures thereof, as for example dioxane, tetrahydrofuran, 2-methylfuran, diethyl ether, dipropyl, ether, dibutyl ether, dimethyl ether of ethylene glycol or diethylene glycol, acetone, methyl ethyl ketone, methyl isobutyl ketone, cycolhexanone and the like.

When solvents such as dioxane, cyclohexanone, tetrahydrofuran, etc., are used as the reaction medium the diene-maleic anhydride copolymer is soluble in polar organic solvents such as dioxane, acetone, methyl ethyl ketone, etc., similar to the copolymer obtained directly from the diene and maleic anhydride. However, when methyl isobutyl ketone is used as the reaction medium, the diene-maleic anhydride copolymer is insoluble in these polar organic solvents.

In accordance with one method of carrying out the present invention, a catalyst solution is prepared by dissolving a free radical initiator such as benzoyl peroxide, tert-butyl preoxypivalate or azobisisobutyronitrile in a solvent which is to serve as the reaction medium. The catalyst solution is then added to a solution of the furan- or 2-methylfuran-maleic anhydride adduct and the conjugated diene. Alternatively, a solution containing the initiator and the diene may be added to a solution containing the adduct.

The rate of addition of the catalyst solution is maintained so as to generate a high concentration of free radicals. The total addition time of the catalyst solution may vary between 5 minutes to 1 hour, preferably from 10 minutes to one half hour.

The solution of the furan-maleic anhydride adduct is heated to the temperature at which it is desired to carry out the polymerization. When the catalyst solution is added to the preheated solution of the diene and the furan-maleic anhydride adduct, or when the catalyst solution containing the diene is added to the solution of the adduct, the initiation of polymerization is indicated by the appearance of a turbidity. The latter soon disappears and the copolymerization continues. In most cases the polymerization is complete as soon as the addition of the catalyst is completed. However, the reaction may be allowed to continue for an additional period of time to ensure completion.

The copolymer is isolated by precipitation with a non-solvent, generally benzene or toluene, and is purified by extraction with the hydrocarbon or by reprecipitation from acetone solution. The copolymer is dried at room temperature or in a vacuum oven at a slightly elevated temperature in the usual manner.

The furan or 2-methylfuran, which is not consumed in the reaction involving the adduct and the conjugated diene, may be recovered and reconverted to the adduct by reaction with maleic anhydride.

In another embodiment of this invention, the furan- or 2-methylfuran maleic anhydride adduct, the conjugated diene, catalyst and solvent are mixed and permitted to flow through a tube which is preheated to the temperature of the polymerization reaction. The effluent from the tube may flow directly into the nonsolvent with resultant precipitation of the copolymer.

The product of the radical catalyzed reaction of a conjugated diene and the furan- or 2-methylfuran-maleic anhydride adduct is the equimolar, alternating diene-maleic anhydride copolymer. Elemental analysis confirms the equimolar composition, free of furan moieties while the NMR spectrum confirms the alternating structure.

This invention will be more fully understood by reference to the following illustrative embodiments.

EXAMPLE 1

After 10 mmoles of the adduct of furan and maleic anhydride (M.P. 124–125° C.) was dissolved in 5 ml. of distilled peroxide-free dioxane in a pyrex tube stoppered with a rubber serum cap, the solution was heated to 95° C. in a water bath. A mixture of 0.5 mmole of tert-butyl peroxypivalate (75% solution in mineral spirits), 10 mmoles of isoprene and 1 ml. of dioxane was prepared in a tube and was cooled in ice water.

The solution containing isoprene and tert-butyl peroxypivalate was added to the preheated solution of the furan-maleic anhydride adduct with a hypodermic syringe through the rubber serum cap over a total period of 10 minutes with stirring. The reaction was terminated immediately after the catalyst addition was complete by pouring the solution over excess cold dry benzene. The isoprene-maleic anhydride copolymer precipitated and was isolated by filtration, washed thoroughly with hot benzene and finally with petroleum ether and dried in vacuo at 50° C. The copolymer obtained in 86% yield had a softening point of 145–150° C. and an intrinsic viscosity of 0.125 dl./g. in methyl ethyl ketone at 30° C.

The isoprene-maleic anhydride copolymer was soluble in cold acetone, methyl ethyl ketone, cyclohexanone, dimethylformamide and tetrahydrofuran and insoluble in benzene, toluene, carbon tetrachloride, hexane and chloroform.

EXAMPLE 2

After 20 mmoles of furan-maleic anhydride adduct was dissolved in 14 ml. distilled peroxide-free dioxane in a 3-necked flask equipped with a water-cooled condenser and a magnetic stirrer, the solution was heated to 80° C. in a water bath. The catalyst solution was prepared by mixing 1 mmole of tert-butyl peroxypivalate, 20 mmoles of isoprene and 2 ml. of dioxane. This solution was added from a dropping funnel to the preheated solution of the furan-maleic anhydride adduct over a total period of 10 minutes. The reaction was allowed to continue for another 10 minutes after the catalyst addition was complete. The polymer was recovered by precipitation with benzene, washed thoroughly with hot benzene and finally with pertoleum ether and dried in a vacuum oven at 50° C. The isoprene-maleic anhydride copolymer in 47% yield had a softening point of 135–145° C. The intrinsic viscosity in methyl ethyl ketone at 30° C. was 0.14 dl./g.

EXAMPLE 3

Nitrogen was bubbled for 10 minutes through a solution of 10 mmoles of the adduct of furan and maleic anhydride in 10 ml. of distilled peroxide-free dioxane in a Pyrex tube stoppered with a rubber serum cap. The solution was then heated to 80° C. A solution of 1 mmole of tert-butyl peroxy-pivalate, 20 mmoles of isoprene and 2 ml. of dioxane was added to the preheated solution of the furan-maleic anhydride adduct over a period of 10 minutes through a hypodermic syringe in the serum cap. The reaction was immediately stopped after the addition of the catalyst solution was complete by pouring the contents of the tuber over excess cold dry benzene. The polymer precipitated and was isolated by filtration, washed thoroughly with hot benzene and finally with pertoleum ether and then dried in a vacuum over at 50° C. The isoprene-maleic anhydride copolymer obtained in 25% yield had a softening point of 125–135° C. The intrinsic viscosity in methyl ethyl ketone at 30° C., was 0.13 dl./g. Analysis calculated for $C_9H_{10}O_3$: C 65.01%, H 6.07%, O 28.92%. Found: C 64.90%, H 6.08%, O 29.06%.

EXAMPLE 4

Following the procedure described in Example 3, 10 mmoles of the adduct of furan and maleic anhydride was dissolved in 10 ml. of distilled peroxide-free dioxane and was reacted with 10 mmoles of isoprene in the presence of 1 mmole of tert-butyl peroxypivalate at 80° C. The isoprene-maleic anhydride copolymer was isolated and dried as described in Example 3. The yield of copolymer was 29% and the copolymer had a softening point of 125–135° C. The intrinsic viscosity in methyl ethyl ketone at 30° C. was 0.125 dl./g.

EXAMPLE 5

The procedure described in Example 1 was followed using 10 mmoles of the furan-maleic anhydride adduct in 5 ml. of dioxane and 40 mmoles of isoprene and 0.5 mmole of tert-butyl peroxypivalate in 1 ml. of dioxane. The yield of isoprenemaleic anhydride copolymer which had a softening point of 145–150° C. was 68%. The intrinsic viscosity of the copolymer in methyl ethyl ketone at 30° C. was 0.18 dl./g.

EXAMPLE 6

After 5 mmoles of furan-maleic anhydride adduct was reacted with 5 mmoles of isoprene at 80° C. in the presence of 0.5 mmole of tert-butyl peroxypivalate in 6 ml. dioxane, following the same procedure as described in Example 3, the reaction mixture was maintained at 80° C. for an additional 30 minutes. The isoprene-maleic anhydride copolymer obtained in 29% yield had a softening point of 125–135° C. The intrinsic viscosity in methyl ethyl ketone at 30° C. was 0.162 dl./g.

EXAMPLE 7

Following a procedure similar to that described in Example 1, 10 mmoles of furan-maleic anhydride adduct was reacted with 10 mmoles of isoprene in the presence of 0.5 mmole of tert-butyl peroxypivalate in 10 ml. of distilled tetrahydrofuran at 65° C. After a total reaction time of 20 minutes, the isoprene-maleic anhydride copolymer was obtained in 8% yield and had a softening point of 120°–125° C.

EXAMPLE 8

Following a procedure similar to that described in Example 1, 5 mmoles of furan-maleic anhydride adduct was reacted with 5 mmoles of isoprene in the presence of 0.5 mmole of tert-butyl peroxypivate in 6 ml. of a mixture of tetrahydrofuran and methyl isobutyl ketone (2:1 vol./vol.) at 80° C. The isoprene-maleic anhydride copolymer obtained in 29% yield had a softening point of 115–120° C. The intrinsic viscosity of the copolymer in methyl ethyl ketone at 30° C. was 0.08 dl./g.

EXAMPLE 9

When 10 mmoles of furan-maleic anhydride adduct was reacted with 10 mmoles of isoprene in the presence of 0.5 mmole of azobisisobutyronitrile in 6 ml. of distilled peroxide-free dioxane at 80° C., according to the procedure described in Example 1, the isoprene-maleic anhydride copolymer was obtained in 23% yield and had a softening point of 140–145° C. The intrinsic viscosity of the copolymer in methyl ethyl ketone at 30° C. was 0.21 dl./g.

EXAMPLE 10

As described in Example 1, 5 mmoles of furan-maleic anhydride adduct was reacted with 5 mmoles of 1,3-pentadiene in the presence of 0.5 mmole of tert-butyl peroxypivalate in 4 ml. of distilled peroxide-free dioxane at 80° C. The pentadiene maleic anhydride copolymer obtained in 33% yield had a softening point of 135–145° C. The intrinsic viscosity in methyl ethyl ketone at 30° C. was 0.16 dl./g.

EXAMPLE 11

After 10 mmoles of furan-maleic anhydride adduct was dissolved in 8 ml. of distilled peroxide-free dioxane in a 3-necked flask equipped with a cold-finger (cooled with an acetone/Dry Ice mixture), a magnetic stirrer and a rubber serum cap, 10 mmoles of butadiene was added by distillation through a tube dipping under the surface of the solution. The mixture was then heated to 80° C. and 0.5 mmole tert-butyl peroxypivalate mixed with 2 ml. of dioxane was added through the rubber serum cap by means of a hypodermic syringe over a total period of 10 minutes. After the addition of the catalyst was complete, the reaction was allowed to continue for 20 minutes. The polymer was isolated as usual by precipitation in dry cold benzene, filtered, washed thoroughly with hot benzene, finally washed with petroleum ether and dried at 50° C. under vacuo. The yield of butadiene-maleic anhydride copolymer was 68%, and the copolymer had a softening point of 120–130° C. The intrinsic viscosity in methyl ethyl ketone at 30° C. was 0.14 dl./g.

EXAMPLE 12

The furan-maleic anhydride adduct, 5 mmoles, was reacted, under the same experimental conditions as described in Example 10, with 5 mmoles of 1-methoxy-1,3-butadiene in 6 ml. of distilled peroxide-free dioxane, in the presence of 0.5 mmole of tert-butyl peroxypivalate at 80° C. The total time of reaction was 20 minutes. The 1-methoxybutadiene-maleic anhydride copolymer obtained in 83% yield had a softening point of 160–165° C. The intrinsic viscosity in methyl ethyl ketone at 30° C. was 0.18 dl./g.

EXAMPLE 13

Under the experimental conditions described in Example 10, 5 mmoles of the furan-maleic anhydride adduct was reacted with 5 mmoles of 2,5-dimethyl-2,4-hexadiene in 6 ml. of distilled peroxide-free dioxane, in the presence of 0.5 mmole of benzoyl peroxide at 80° C. The total time of reaction was 20 minutes. The 2,5-dimethyl-2,4-hexadiene-maleic anhydride copolymer obtained in 9% yield had a softening point of 150–160° C. The intrinsic viscosity of the copolymer in methyl ethyl ketone at 30° C. was 0.16 dl./g.

EXAMPLE 14

The furan-maleic anhydride adduct, 5 mmoles, was reacted, under the same experimental conditions as in Example 10, with 5 mmoles of 2,3-dimethyl-1,3-butadiene in 6 ml. of distilled peroxide-free dioxane, in the presence of 0.5 mmole tert-butyl peroxypivalate at 80° C. The total time of reaction was 20 minutes. The 2,3-dimethylbutadiene-maleic anhydride copolymer obtained in 37% yield had a softening point of 140–155° C. The intrinsic viscosity in methyl ethyl ketone at 30° C. was 0.10 dl./g.

EXAMPLE 15

The 2-methylfuran-maleic anhydride adduct, 10 mmoles, was dissolved in 6 ml. of cyclohexanone and heated to 80° C. A solution of 10 mmoles of isoprene and 1 mmole of tert-butyl peroxypivalate in 1 ml. of cyclohexanone was added to the adduct solution over a period of 10 minutes. The reaction mixture was maintained at 80° C. for 20 minutes after the addition was completed and then poured into benzene. The precipitated polymer was filtered, washed with warm benzene and dried in vacuo at 50° C. The yield of equimolar, alternating isoprene-maleic anhydride copolymer was 61%.

EXAMPLE 16

The 2-methylfuran-maleic anhydride adduct, 10 mmoles, was reacted with 10 mmoles of isoprene in the presence of 1 mmole of tert-butyl peroxypivalate, under experimental conditions similar to those described in Example 15, using 6 ml. of 2-methylfuran as solvent and a reaction temperature of 60° C. The yield of isoprene-maleic anhydride copolymer was 23%.

The copolymers of the present invention may be employed as thickeners, stabilizers, dispersants, binders, emulsifiers, leveling agents, coatings etc.

While particular embodiments of this invention are shown above, it will be understood that the invention is obviously subject to variations and modifications without departing from its broader aspects.

What is claimed is:

1. A process for the preparation of alternating copolymers of maleic anhydride and conjugated dienes which comprises reacting the Diels-Alder adduct of furan or 2-methylfuran and maleic anhydride with a conjugated diene in the presence of a free radical initiator.

2. The process of claim 1 wherein said conjugated diene is selected from the group consisting of butadiene, isoprene, 1,3-pentadiene, 1-methoxy-1,3-butadiene, 2,3-dimethylbutadiene and 2,5-dimethyl-2,4-hexadiene.

3. The process of claim 1 wherein said free radical initiator is an azo or peroxide compound.

4. The process of claim 1 wherein the temperature of reaction is above 60° C.

References Cited

UNITED STATES PATENTS

| | | | |
|---|---|---|---|
| 3,491,068 | 1/1970 | Gaylord | 260—78.5 |
| 3,494,897 | 2/1970 | Reding et al. | 260—78.5 |
| 2,870,196 | 1/1959 | Barney et al. | 260—485 |

OTHER REFERENCES

Maleic Anhydride Derivatives, Gardner and Flett, pp. 186–187, 1952.

JOSEPH L. SCHOFER, Primary Examiner

J. KIGHT, Assistant Examiner

U.S. Cl X.R.

260—88.3 R, 88.5